(12) United States Patent
Mehrl et al.

(10) Patent No.: US 10,768,044 B2
(45) Date of Patent: Sep. 8, 2020

(54) OPTICAL SENSOR DEVICE

(71) Applicant: ams International AG, Rapperswil (CH)

(72) Inventors: David Mehrl, Plano, TX (US); Troy Chesler, Sachse, TX (US); Eugene G. Dierschke, Dallas, TX (US)

(73) Assignee: ams International AG, Rapperswil (CH)

( * ) Notice: Subject to any disclaimer, the term of this patent is extended or adjusted under 35 U.S.C. 154(b) by 22 days.

(21) Appl. No.: 16/306,649

(22) PCT Filed: May 31, 2017

(86) PCT No.: PCT/EP2017/063202
§ 371 (c)(1),
(2) Date: Dec. 3, 2018

(87) PCT Pub. No.: WO2017/211648
PCT Pub. Date: Dec. 14, 2017

(65) Prior Publication Data
US 2019/0154498 A1    May 23, 2019

Related U.S. Application Data

(60) Provisional application No. 62/346,103, filed on Jun. 6, 2016.

(30) Foreign Application Priority Data

Jun. 29, 2016    (EP) ..................... 16176932

(51) Int. Cl.
*G01J 1/42* (2006.01)
*G01J 1/02* (2006.01)
(Continued)

(52) U.S. Cl.
CPC ............... *G01J 1/0266* (2013.01); *G01J 1/06* (2013.01); *G01J 1/42* (2013.01); *G01J 1/4204* (2013.01);
(Continued)

(58) Field of Classification Search
CPC ... G01N 2021/6419; G01N 2021/6421; G01N 2021/6439; G01N 21/6408;
(Continued)

(56) References Cited

U.S. PATENT DOCUMENTS

2009/0230313 A1    9/2009   Chiba
2016/0041035 A1*   2/2016   Allen ................ G01J 1/0233
                                                             356/402

(Continued)

FOREIGN PATENT DOCUMENTS

EP    2873953       5/2015
JP    2003-021688   1/2003
JP    2003-130727   5/2003

OTHER PUBLICATIONS

European Patent Office, International Search Report, PCT/EP2017/063202, dated Sep. 28, 2017.

*Primary Examiner* — Michael P Stafira
(74) *Attorney, Agent, or Firm* — Fish & Richardson P.C.

(57) ABSTRACT

An optical sensor device comprises a first and a second optical sensor arrangement. In the first optical sensor arrangement at least one optical sensor structure measures the incidence angle of incoming light that is approximately on the main beam axis of a light source. The second optical sensor arrangement comprises at least one optical sensor structure with at least one optical sensor, at least two metal layers and opaque walls optically isolating the optical sensor. An evaluation circuit provides an output signal of the second optical sensor arrangement under the condition that (Continued)

the incidence angle measured by the first optical sensor arrangement lies within a set interval.

13 Claims, 6 Drawing Sheets

(51) Int. Cl.
    *G01J 1/06*     (2006.01)
    *G01S 3/786*     (2006.01)
    *G01S 3/783*     (2006.01)

(52) U.S. Cl.
    CPC .............. *G01J 1/429* (2013.01); *G01S 3/783* (2013.01); *G01S 3/7861* (2013.01); *G01J 2001/4266* (2013.01)

(58) Field of Classification Search
    CPC ............ G01N 21/6428; G01N 21/648; G01N 2021/6463; G01N 21/6454; G01N 2201/0696; G01N 2201/08; G01N 2201/12; G01N 2201/062; G01N 21/6452; G01N 2201/0446; G01N 15/1436; G01N 21/17; G01N 21/253; G01N 21/274; G01N 21/78; G01N 33/54326; G01N 33/54366; G01N 21/85; G01B 11/002; G01J 1/4204; G01J 1/0474; G01J 1/0425; G01J 1/0488; G01J 1/0204; G01J 1/0266; G01J 1/0407; G01J 1/0414; G01J 1/0422; G01J 1/0429; G01J 1/0437; G01J 1/0492; G01J 1/06; G01J 1/16; G01J 1/42; G01J 1/429; G01J 1/44; G01J 2001/4266; G01J 2001/448; G01J 2003/2806; G01J 2003/2826

See application file for complete search history.

(56) References Cited

U.S. PATENT DOCUMENTS

2016/0309564 A1* 10/2016 Jia ..................... G01J 1/0242
2019/0080668 A1* 3/2019 Holenarsipur ........ G01J 1/0437

\* cited by examiner

OPTICAL SENSOR DEVICE

BACKGROUND OF THE INVENTION

The present application relates to an optical sensor device that can detect directional and non-directional light, for example ultra-violet light.

Light reaching an optical sensor can be either direct, which means it comes directly from the light source and is not scattered, or it can be non-directional or ambient, which means that it is scattered. For the present application the light source can be, for example, the sun. Therefore, on a clear day with no clouds, nearly all of the light coming from the sun to the sensor is direct and not scattered. However, on a cloudy day most of the light reaching the sensor is scattered and comes from different directions. In order to measure the intensity of, for example, ultra-violet light, for different surrounding light conditions or different weather conditions it is necessary to detect light that comes from different directions.

A known solution for detecting ultra-violet light is employing an interference filter on top of an optical sensor. The interference filter requires the incident light to be perpendicular towards the light-sensitive surface or nearly perpendicular to this surface. In order to limit the range of incidence angles of the light a diffuser with an air gap is employed. With the diffuser only light with an incidence angle close to 90° towards the light-sensitive surface is passed to the sensor.

However, this arrangement with the diffuser and the air gap requires a certain package height of the sensor structure. Furthermore, in this arrangement the signal that should be detected is attenuated by the diffuser. This means that the optical sensor has to be very sensitive to also detect the attenuated signal.

SUMMARY OF THE INVENTION

The present disclosure provides an optical sensor device that measures the incidence angle of incoming light that is approximately on the main beam axis of a light source and that comprises a small package height.

The optical sensor device comprises at least two optical sensor arrangements and an evaluation circuit. The first optical sensor arrangement comprises at least one optical sensor structure which can measure the incidence angle of incoming light that is approximately on the main beam axis of a light source. The light source can be, for example, the sun. Light that is approximately on the main beam axis of the light source is direct light and light that is not on the main beam axis of the light source is scattered or ambient light.

The second optical sensor arrangement comprises at least one optical sensor structure with at least one optical sensor with a light-sensitive surface. An aperture is formed above the optical sensor by a layer structure including at least two metal layers where one of the layers is in the plane of the optical sensor and the other one is stacked further above. Opaque walls may connect the layers to help optically isolate the optical sensor. The field of view of the optical sensor is limited to for example 15°. Thus, no diffuser is required to limit the range of incidence angles of incoming light. Therefore, direct (unscattered) light is not attenuated before it reaches the optical sensor. Also, without a diffuser and an air gap, a small package height can be realized.

The evaluation circuit is connected to an output of the first optical sensor arrangement and to an output of the second optical sensor arrangement. The evaluation circuit provides the output signal of the second optical sensor arrangement under the condition that the incidence angle measured by the first optical sensor arrangement lies within a set interval. In order to detect direct light with the second optical sensor arrangement it is necessary to orient the light-sensitive surface of the optical sensor perpendicular towards the direct incoming light. Therefore, the evaluation circuit only provides the output signal of the second optical sensor arrangement if the incidence angle of the incoming light is 90° or close to 90° towards the light-sensitive surface. Thus, the orientation of the optical sensor device can be adjusted in such a way that the incidence angle of the incoming light lies within the set interval so that the evaluation circuit provides the output signal of the second optical sensor arrangement.

In a preferred embodiment the incidence angle of direct incoming light is measured by directional sensor structures. The first optical sensor arrangement comprises at least two further optical sensor structures. The at least three optical sensor structures are directional and detect light incident from at least three different directions.

In a preferred embodiment the first optical sensor arrangement comprises at least four directional optical sensor structures. By measuring the incidence angle of direct light it is possible to adjust the orientation of the optical sensor device in such a way that the incidence angle is 90° or close to 90°. For the preferred embodiment with four directional optical sensor structures, the four different directions are referred to as N for north, S for south, E for east and W for west. In this case the incidence angle θ of the direct light towards the normal of the light-sensitive surface is estimated by:

$$\theta \approx \sqrt{\theta_{NS}^2 + \theta_{EW}^2},$$

where $\theta_{NS}$ is the incidence angle of the direct light projected in the plane of the two directions N and S, and $\theta_{EW}$ is the incidence angle of the direct light projected in the plane of the two directions E and W. The angle θ is also referred to as the zenith.

Furthermore, it is also possible to estimate the azimuth Φ by:

$$\phi \cong \operatorname{atan}\left(\frac{E - W / E + W}{N - S / N + S}\right),$$

where N, S, E and W are the intensities measured by the respective directional sensors and a tan is the four-quadrant arctangent which returns an angle between −π and π.

In other embodiments it is also possible to employ more than four directional sensors, for example eight.

In one embodiment the at least one optical sensor structure in the first optical sensor arrangement comprises at least one optical sensor with a light-sensitive surface. An aperture is formed above the optical sensor by a layer structure including at least two metal layers where one of the layers is in the plane of the optical sensor and the other one is stacked further above. Opaque walls connect the layers and they optically isolate the optical sensor. This means that if the incidence angle of the direct light is 90° or close to 90° nearly only direct light is detected by the optical sensor. In this situation the at least three directional optical sensor structures detect ambient light from different directions. In this embodiment the evaluation circuit displays a ratio of the signal detected by the at least three directional optical sensor structures in the first optical sensor arrangement to the signal detected by the at least one optical sensor structure in the first optical sensor arrangement which detects the direct light. This ratio is referred to as the haze index.

The haze index HI is calculated as follows:

$$HI = \frac{k(N + S + E + W)}{H},$$

where k is a constant of proportionality and H is the intensity measured by the optical sensor structure detecting direct light. The constant k is chosen in such a way that the haze index is normalized between 0 and 1.

Therefore, the haze index gives a ratio of ambient versus direct light. For outside conditions this means that the haze index is a measure for the cloudiness of the respective weather situation.

In one embodiment the optical sensor device comprises one further optical sensor structure in the first optical sensor arrangement. This further optical sensor structure comprises at least one optical sensor with a light-sensitive surface. An aperture is formed above the optical sensor by a layer structure including at least two metal layers where one of the layers is in the plane of the optical sensor and the other one is stacked further above. Opaque walls may connect the layers to help optically isolate the optical sensor. Another opaque layer blocks light that is incident perpendicular towards the light-sensitive surface. Thus, this further optical sensor structure detects scattered light which is coming from different directions. With this further optical sensor structure the haze index can be determined by the ratio of the output signals from this optical sensor structure and from the optical sensor structure which detects direct light. An advantage of this embodiment is that only two optical sensor structures are required to determine the haze index. This means that only two analogue-digital channels are required instead of five.

In a preferred embodiment these two optical sensor structures required to determine the haze index detect light in the visible range. Their sensor area is small so that they can be operated outside without suffering from saturation in direct sunlight.

In one embodiment the evaluation circuit provides the output signal of the second optical sensor arrangement under the condition that the output signal of the optical sensor structure detecting the direct light reaches a maximum value and that the output signal of the optical sensor structure detecting the scattered light reaches a minimum value. This means that the incidence angle of the incoming light does not have to be measured, but by comparing the signals of these two optical sensor structures it can be determined under which conditions the optical sensor device is oriented perpendicular to the direct light or close to perpendicular.

In one embodiment the output signal of the second optical sensor arrangement is corrected in such a way that the intensity of all of the ambient light can be estimated. Due to the aperture the field of view of the directional sensors is limited to a certain opening angle α. Therefore, not all the ambient light is detected. If the light source is assumed to be Lambertian, the irradiance I reaching the sensor can be estimated by:

$$I = 2\pi \int_0^\alpha \sin\beta \cos\beta d\beta = \pi(\sin\alpha)^2,$$

where the intensity is assumed to be 1 Watt per steradian and it is integrated over a sphere with the radius 1. The irradiance on a fully exposed surface is π. Thus, the fraction detected by a directional sensor with an opening angle α amounts to $\sin^2\alpha$.

If, for example, ultra-violet light is measured and the light is assumed to be only ambient, its total intensity $UV_{estimated}$ can be estimated as follows:

$$UV_{estimated} = \frac{UV_{measured}}{\sin^2\alpha},$$

where $UV_{measured}$ is the measured intensity.

The total intensity of the ultra-violet light can also be estimated for different haze indices. This means that the intensity of the ultra-violet light can be estimated for different weather situations. For the haze index being a value between 0 and 1, the estimated total intensity of the ultra-violet light is given by:

$$UV_{estimated} = UV_{measured} \cdot (k_a f(HI) + k_d (1 - f(HI))),$$

where f is a weakly non-linear and monotonically increasing function of the haze index HI, and $k_a$ and $k_d$ are constants.

In one embodiment the optical sensor structures in the first optical sensor arrangement which measure direct and the ones that measure ambient light contain color filters above their apertures. By employing these color filters the color correlated temperature can be determined.

In one embodiment there are two color filters of each color but only one sensor without a color filter. With this, the area of the sensor without a color filter is smaller than the total area of the sensors with color filters. Mostly, the sensor without the color filter receives more radiation than the ones with the color filters, so it saturates before the color filter sensors. Thus, in this arrangement the dynamic range of the color sensor is increased since the sensor area of the sensor without a color filter is smaller than the area of the sensors with a color filter. Furthermore, only one color filter is employed per optical sensor so that an angle-dependent color breakup is avoided.

In one embodiment the evaluation circuit provides the output signal of the second optical sensor arrangement under the condition that the measured color correlated temperature is within a set range. The color correlated temperature is also a measure for the haziness. Therefore, certain temperatures can be defined so that the output signal of the second optical sensor arrangement is only provided for certain weather conditions.

In one embodiment the measured incidence angle of the incoming light is displayed by the evaluation circuit. This allows to adjust the orientation of the optical sensor device in such a way that the direct light is perpendicular towards the light-sensitive surfaces.

In one embodiment the range for valid values of the output signal of the first optical sensor arrangement can be set. With this, the required accuracy of the alignment of the optical sensor device towards the direct incident light can be set.

In one embodiment the optical sensor structures in the first and/or the second optical sensor arrangement are shaped hexagonally and they are arranged in a honeycomb structure. This arrangement allows a close packing of the optical sensor structures. If the optical sensor device is operated only outside, the sensor structures can be small since the intensity of the outside light is very high. If the optical sensor device is operated inside the sensor structure area is larger to enable sensing small intensities.

In one embodiment at least one optical sensor structure in the first optical sensor arrangement is covered with an infrared-blocking filter. Preferably, the first optical sensor arrangement detects light in the visible range. For outdoor conditions these sensors can be very small since the visible outside light is very intense. It is also desired to determine the haze index from light in the visible range because the scattering of ultraviolet and infrared light can be very different. However, the scattering of ultra-violet light is expected to correlate better with visible light.

In a preferred embodiment the second optical sensor arrangement detects ultra-violet light and therefore at least one optical sensor structure in the second optical sensor arrangement is covered with an ultra-violet pass filter. This embodiment is preferred since the objective of the application is to detect ultra-violet light under different surrounding light conditions.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1:
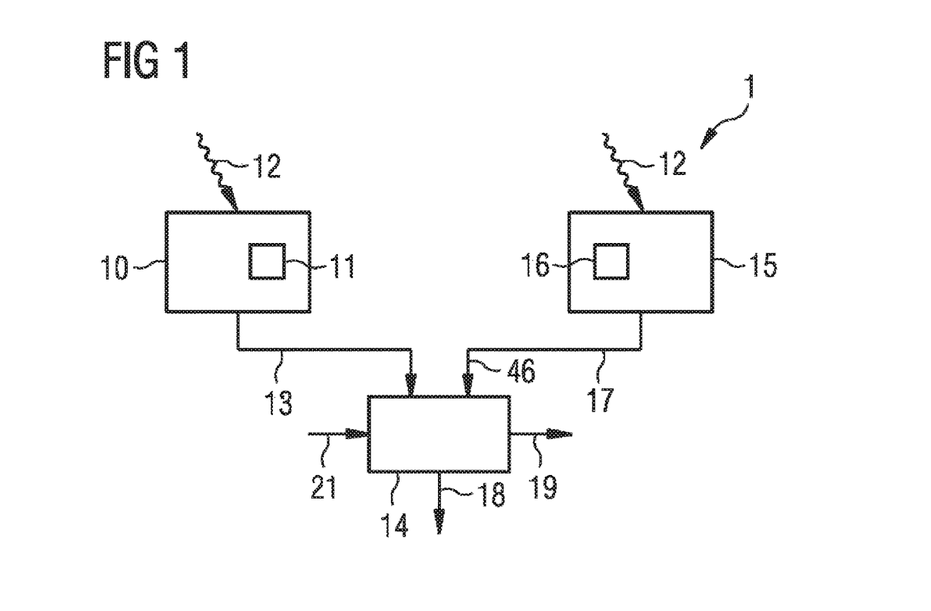
FIG. 1 shows an exemplary embodiment of the optical sensor device.

FIG. 1 shows an embodiment of an optical sensor device 1 that detects directional and non-directional light. A first optical sensor arrangement 10 includes at least one optical sensor structure 11. The first optical sensor arrangement 10 detects incident light 12. An output 13 of the first optical sensor arrangement 10 is connected to an evaluation circuit 14. A second optical sensor arrangement 15 includes at least one optical sensor structure 16. The second optical sensor arrangement 15 detects incident light 12. The second optical sensor arrangement 15 has an output 17 which is connected to the evaluation circuit 14 and provides an output signal 46. The evaluation circuit 14 has at least two outputs 18 and 19. The output 18 provides the output signal 46 of the second optical sensor arrangement 15. The first optical sensor arrangement 10 measures the incidence angle θ of incoming light 12 that is approximately on the main beam axis 20 of a light source 22. The output 19 of the evaluation circuit 14 provides the incidence angle θ measured by the first optical sensor arrangement 10. By an input 21 of the evaluation circuit 14 a range for allowed values of the incidence angle θ is set. The evaluation circuit 14 provides the output signal 46 of the second optical sensor arrangement 15 under the condition that the measured incidence angle θ is within the set range. The output 19 of the evaluation circuit 14 provides the measured incidence angle θ so that the orientation of the optical sensor device 1 can be changed in such a way that the measured incidence angle θ is within the given range.

Figure 2A:
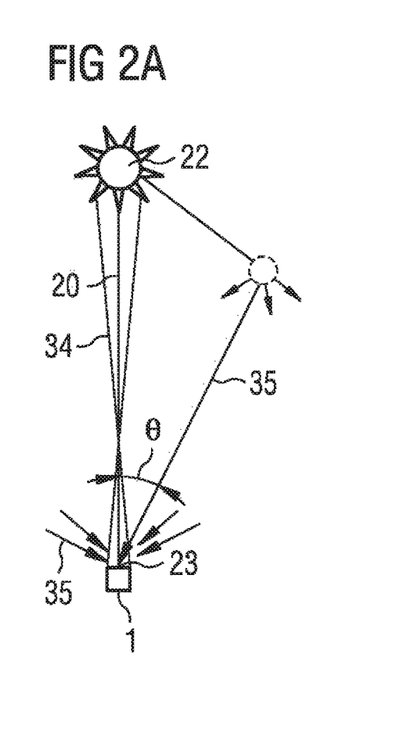
FIGS. 2A and 2B show the incidence of direct and ambient sunlight onto the detector aperture.
Figure 2B:
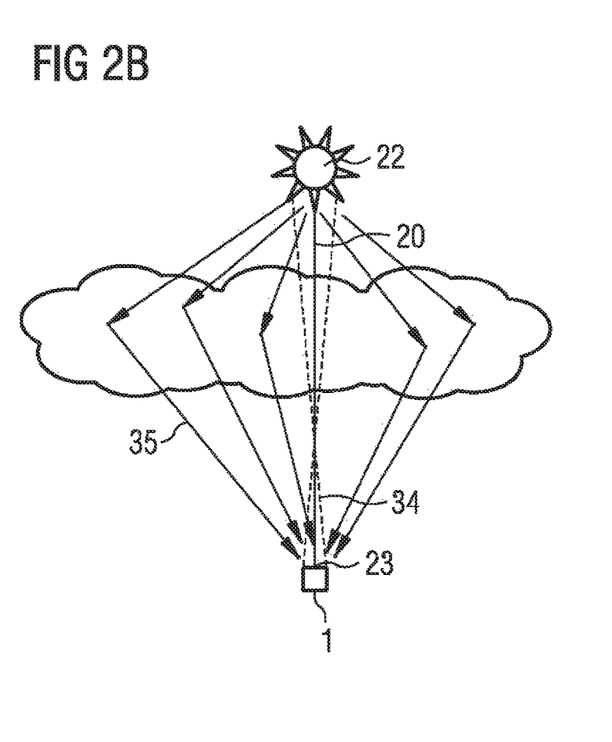

FIGS. 2A and 2B show the optical sensor device 1 and a light source 22 which, for example, can be the sun, as shown in this case. FIG. 2A shows the case of a clear day. Most of the sunlight is not scattered and reaches a detector aperture 23 directly. At the detector aperture 23 the angular spread of direct sunlight 34 amounts to 0.5°. Under these weather conditions only about 10% of the solar radiation is scattered. Scattered or ambient light 35 reaches the detector aperture 23 from different angles. FIG. 2B shows the case of a cloudy or overcast day. Almost no direct light 34 reaches the detector aperture 23. Most of the light that reaches the detector aperture is scattered.

Figure 3A:
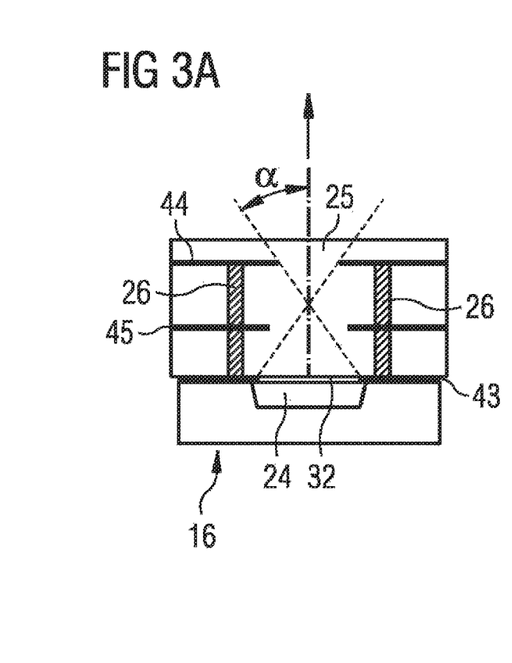
FIGS. 3A to 3C show the setup of examples of different optical sensor structures.

FIG. 3A shows an exemplary embodiment of the optical sensor structure 16 of the second optical sensor arrangement 15. The optical sensor structure 16 comprises an optical sensor 24, at least two metal layers 43 and 44 and an aperture 25. In one embodiment the optical sensor structure 16 comprises three metal layers 43, 44 and 45. Vias or other connectors 26 may connect the metal layers and optically isolate the optical sensor 24. The aperture 25 defines an angular field of view of the optical sensor 24 with an opening angle of α. In a preferred embodiment the optical sensor 24 is an ultra-violet light sensor.

Figure 3B:
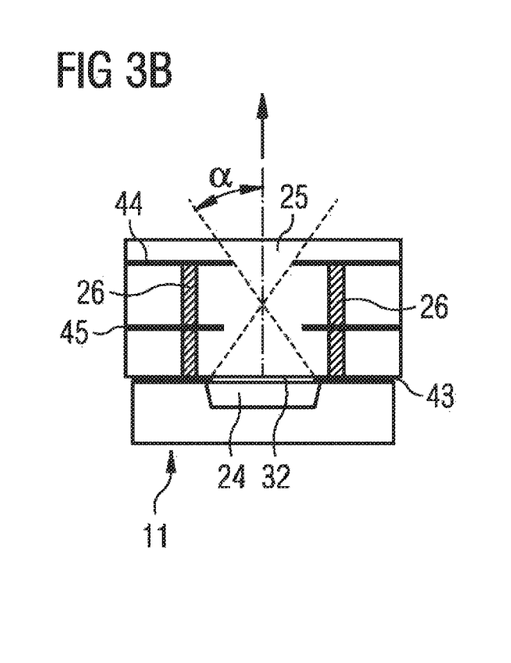

FIG. 3B shows one embodiment of the optical sensor structure 11 of the first optical sensor arrangement 10. The setup is the same as for the optical sensor structure 16 of the second optical sensor arrangement 15. In an alternative embodiment the optical sensor 24 in the optical sensor structure 11 is covered with an infrared blocking filter.

Figure 3C:
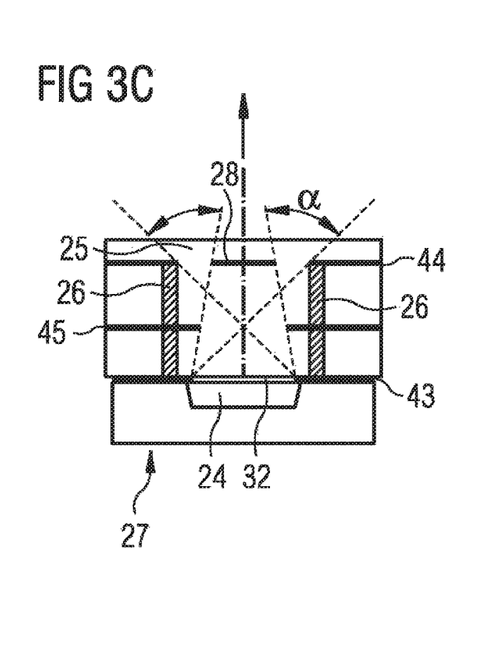

FIG. 3C shows one embodiment of a second optical sensor structure 27 in the first optical sensor arrangement 10. It also comprises the same setup as the optical sensor structure 16 with the only difference that in the plane of the topmost metal layer 44 there is another metal layer 28 that blocks light that is incident perpendicular towards the optical sensor 24. With this, light incident from directions that are not perpendicular towards the optical sensor 24 are detected. In an alternative embodiment the optical sensor 24 in the optical sensor structure 27 is covered with an infrared filter.

Figure 4:
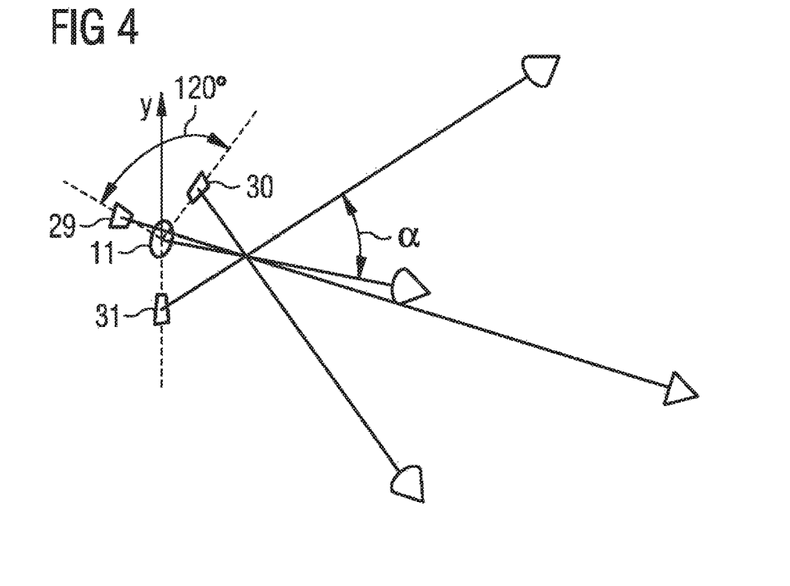
FIG. 4 shows an exemplary embodiment of an optical sensor arrangement that measures the haze index including three directional sensors.

FIG. 4 shows one embodiment of the optical sensor arrangement 10 that measures the incidence angle of direct incident light towards the normal of the optical sensor 24. Three directional sensors 29, 30 and 31 detect light that is incident from different directions but not perpendicular towards the optical sensors. The optical sensor structure 11 detects light that is incident perpendicular towards its light-sensitive surface 32. With this arrangement the incidence angle θ of direct light can be determined.

Figure 5:
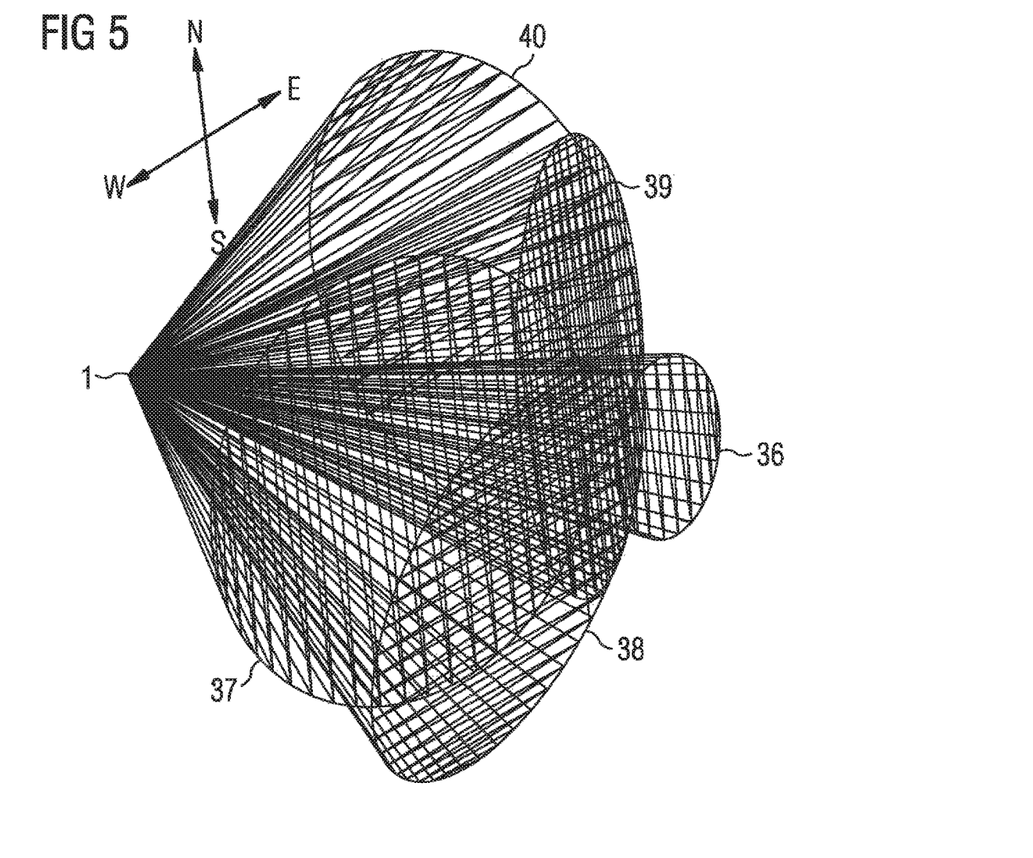
FIG. 5 shows the angular field of view of four directional sensors and one sensor that detects direct light.

FIG. 5 shows angular fields of view 37, 38, 39 and 40 for four different directional sensors. The four directional sensors are referred to as north, south, east and west and they detect incoming light from four different directions. Also the angular field of view 36 of a sensor detecting the direct light is shown, which is defined by the opening angle α of an optical sensor.

Figure 6:
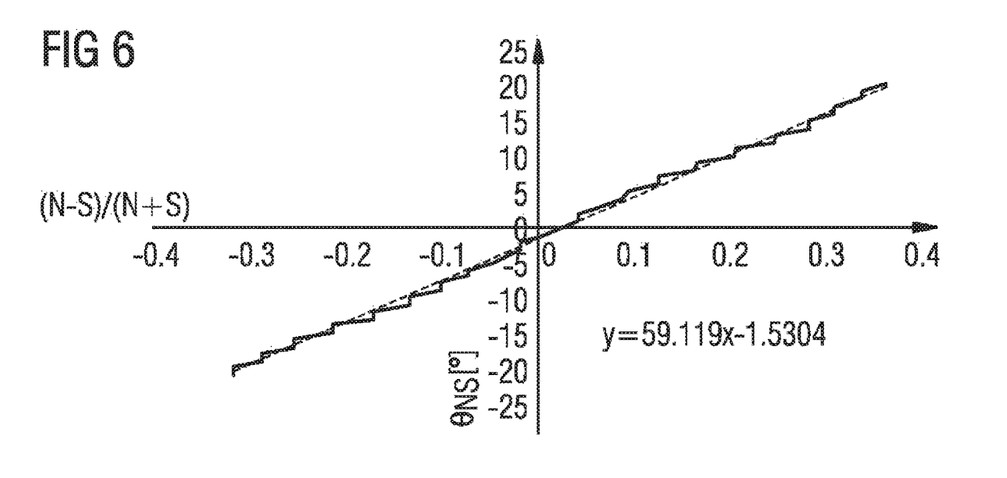
FIG. 6 shows experimental results of an exemplary embodiment that measures the incidence angle.

FIG. 6 shows experimental results for an optical sensor device including two directional sensors referred to as N and S. The incidence angle $\theta_{NS}$ is plotted over the ratio N−S/N+S of the signals of the two directional sensors. In a range of +/−20° the ratio shows a linear shape. The dotted line represents the fitted function y. The offset of −1.5° is due to a measurement artefact. With this it is shown that within a certain range the incidence angle $\theta_{NS}$ of the incident light can be determined. A measurement for the two other directional sensors, E and W, shows a similar behaviour. With this, the two angles $\theta_{NS}$ and $\theta_{EW}$ necessary for the calculation of $\theta$ can be estimated.

Figure 7A:
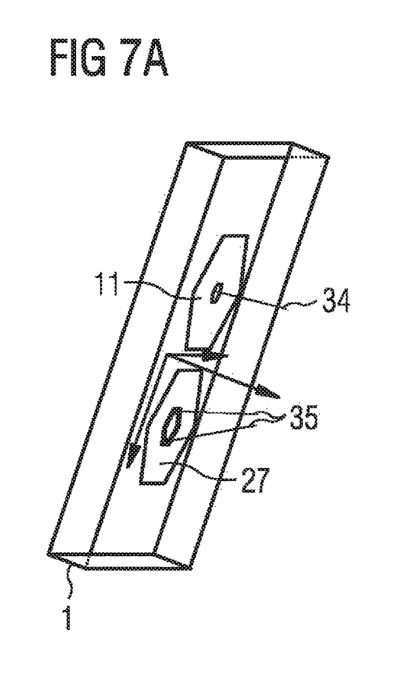
FIG. 7A shows the setup of an exemplary embodiment providing the haze index.

FIG. 7A shows a haze detector employing two optical sensor structures. One optical sensor structure 11 has an aperture 25 such that light is detected which is incident perpendicular towards the light-sensitive surface 32 of the optical sensor 24. The second optical sensor structure 27 detects ambient light incident from different directions. In this embodiment both optical sensor structures are shaped hexagonally.

Figure 7B:
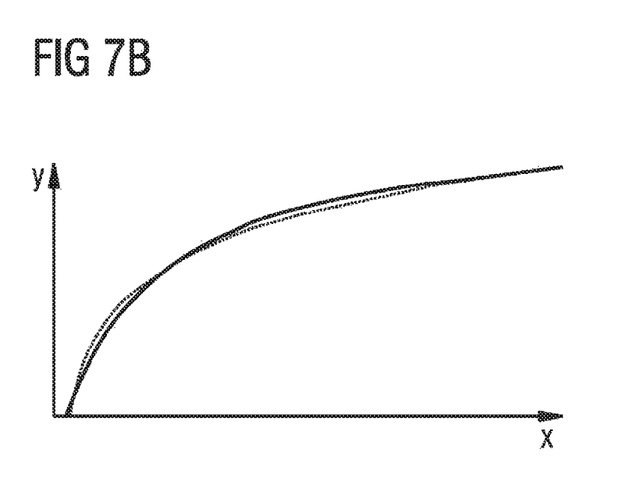
FIG. 7B shows simulation results for an exemplary embodiment providing the haze index.

FIG. 7B shows simulation results for the haze detector depicted in FIG. 7A. On the y-axis different ratios of simulated ambient/direct light power are plotted over the ratio of the signals of the optical sensor structure 27 that detects ambient light and the optical sensor structure 11 that detects direct light on the x-axis. This means that for different light conditions the signal of the haze detector is detected which means the ratio of ambient light towards direct light is measured. The dotted line is a logarithmic fit to the simulated data. Therefore, with the haze index detected by the haze detector the ratio of ambient towards direct light can be estimated.

Figure 8A:
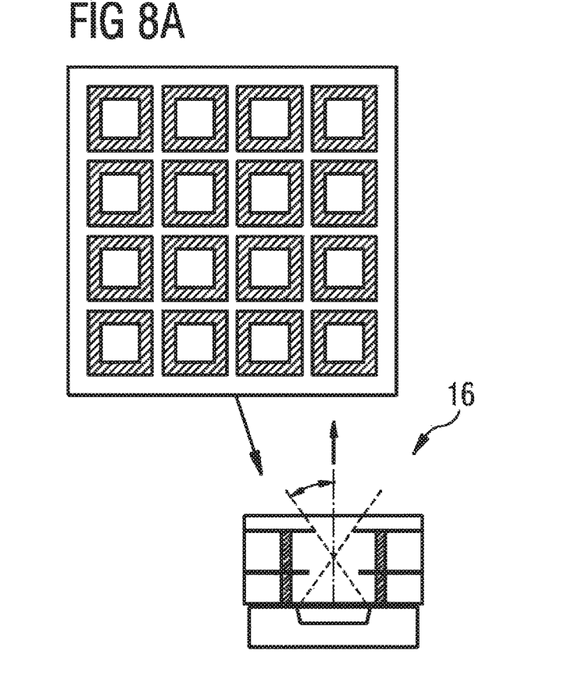
FIG. 8A to 8C show exemplary embodiments with color filters and arrangements of the optical sensor structures.

FIG. 8A shows the optical sensor structure 16 which detects preferably ultra-violet light. According to one embodiment several of these optical sensor structures 16 are arranged in a square lattice where the optical sensor structures are square-shaped. An alternative embodiment is to arrange the optical sensor structures 16 in a honeycomb structure where the optical sensor structures are shaped hexagonally.

Figure 8B:
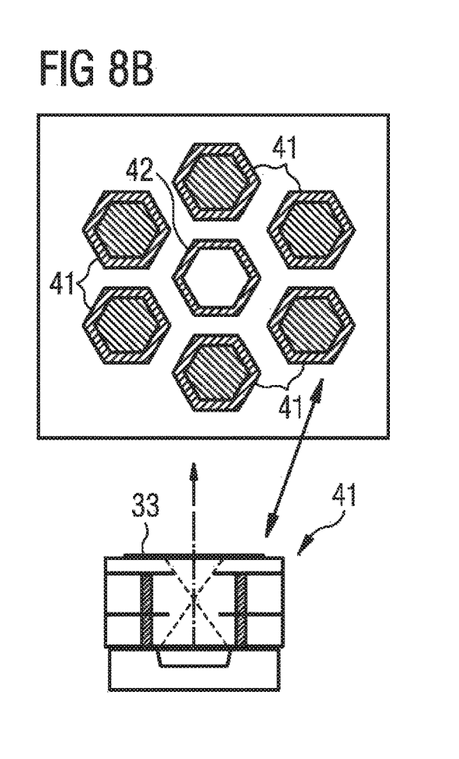

FIG. 8B shows an optical sensor structure 11. In one embodiment a color filter 33 is arranged on top of the aperture 25. By employing different color filters the color-correlated temperature can be determined. In one embodiment the optical sensor structure 11 is shaped hexagonally and several optical sensor structures 11 are arranged in a honeycomb structure array. In one embodiment six optical sensor structures 41 in this array comprise color filters on top of the aperture 25 and one optical sensor structure 42 does not comprise any color filter on top of its aperture. With this, the area of the optical sensor structure 42 without a color filter is smaller than the areas of the optical sensor structures 41 with a color filter such that a saturation of the optical sensor structure 41 is prevented because its area is smaller.

Figure 8C:
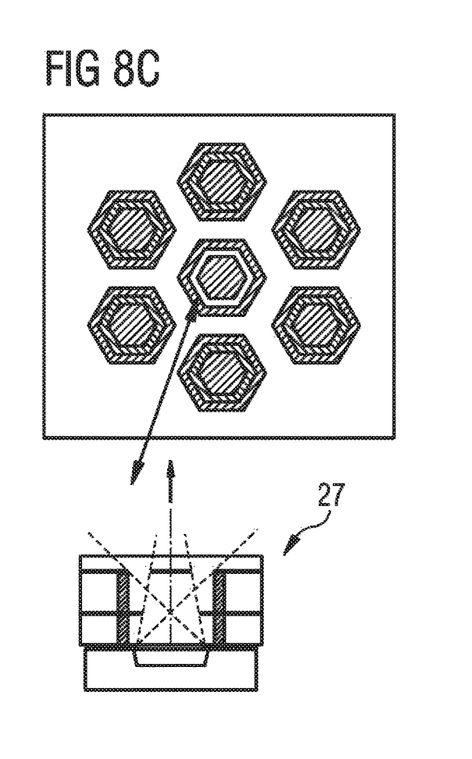

FIG. 8C shows the same setup as in FIG. 8B for an optical sensor structure 27 of the first optical sensor arrangement 10. With this, the color-correlated temperature can also be determined from ambient light.

Figure 9A:
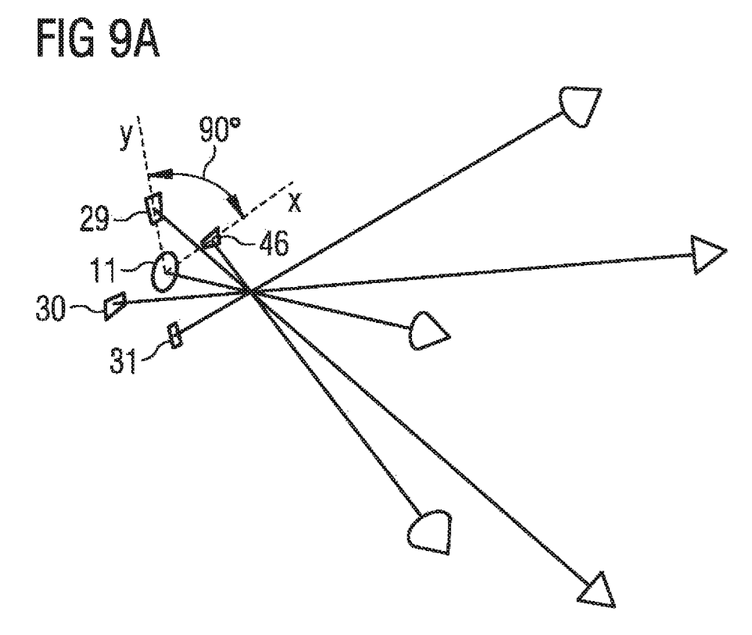
FIGS. 9A and 9B show exemplary embodiments with four and eight directional optical sensor structures, respectively.

FIG. 9A shows a preferred embodiment of the first optical sensor structure 10. Four directional sensor structures 29, 30, 31 and 46 detect ambient light from four different directions. One optical sensor structure 11 detects light that is perpendicular towards the light-sensitive surface 32 of the optical sensor 24. With this optical sensor arrangement the incidence angle $\theta$ of direct incident light can be determined and also the haze index.

Figure 9B:
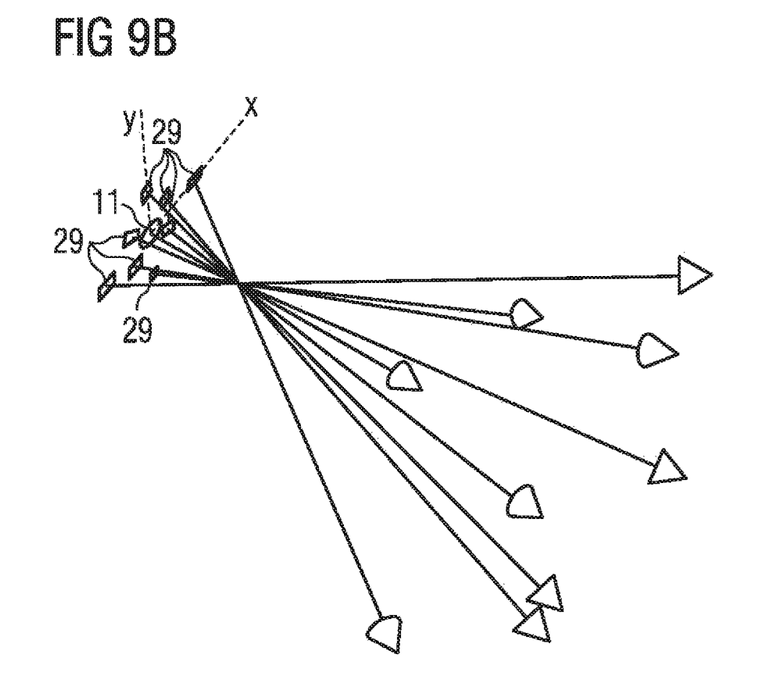

FIG. 9B shows another embodiment of the optical sensor arrangement depicted in FIG. 9A where, instead of four directional sensors, eight directional sensors 29 are employed and detect ambient light incident from eight different directions.

The invention claimed is:

1. An optical sensor device, comprising:
   a first optical sensor arrangement including at least one optical sensor structure, wherein the first optical sensor arrangement is operable to measure an incidence angle of incoming light that is approximately on a main beam axis of a light source;
   a second optical sensor arrangement comprising at least one optical sensor structure having:
      at least one optical sensor with a light-sensitive surface,
      a metal layer structure forming an aperture above the optical sensor including at least two metal layers, one in or above a plane of the optical sensor and the other one stacked further above, and
      opaque walls connecting the metal layers and optically isolating the optical sensor; and
   an evaluation circuit connected to outputs of the first and the second optical sensor arrangement and operable to provide an output signal of the second optical sensor arrangement under a condition that the incidence angle measured by the first optical sensor arrangement lies within a set interval.

2. The optical-sensor device according to claim 1,
   wherein the at least one optical sensor structure of the first optical sensor arrangement comprises:
      at least one additional optical sensor with an additional light-sensitive surface,
      an additional metal layer structure forming an additional aperture above the additional optical sensor including at least additional two metal layers, one in or above a plane of the additional optical sensor and the other one stacked further above, and
      additional opaque walls connecting the additional metal layers and optically isolating the additional optical sensor; and
   wherein the first optical sensor arrangement further comprises at least three further optical sensor structures, wherein the at least three further optical sensor structures are directional, and
   wherein the at least three further optical sensor structures are configured to:
      detect light incident from at least three different directions, including light with incidence angles different from 90° towards a plane of the additional light-sensitive surface, and
      measure an angle between the main beam axis of the light source and a normal of the additional light-sensitive surface.

3. The optical-sensor device according to claim 2, wherein the additional light-sensitive surface of the at least one optical sensor structure of the first optical sensor arrangement is oriented perpendicular to the main beam axis of the light source or deviates from this orientation by a given range, and
   wherein the evaluation circuit is operable to display a ratio of a signal outputted by the at least three directional optical sensor structures in the first optical sensor arrangement to a signal outputted by the at least one optical sensor structure in the first optical sensor arrangement, which is referred to as the haze index.

4. The optical sensor device according to claim 1, wherein the first optical sensor arrangement further comprises at least one further optical sensor structure, wherein each of the at least one optical sensor structure and the at least one further optical sensor structure of the first optical sensor arrangement comprises:
  at least one additional optical sensor with an additional light-sensitive surface,
  an additional metal layer structure forming an additional aperture above the additional optical sensor including at least two additional metal layers, one in or above a plane of the additional optical sensor and the other one stacked further above,
  additional opaque walls connecting the additional metal layers and optically isolating the additional optical sensor, and
wherein the further optical sensor structure further comprises an opaque layer configured to block light that is incident perpendicular towards the additional light-sensitive surface of the further optical sensor structure, such that the least one optical sensor structure of the first optical sensor arrangement detects direct light and the further optical sensor structure of first optical sensor arrangement detects ambient light, and wherein the haze index is determined by a ratio of output signals of the at least one optical sensor structure and the at least one further optical sensor structure of the first optical sensor arrangement.

5. The optical sensor device according to claim 4, wherein the evaluation circuit is operable to provide the output signal of the second optical sensor arrangement under the condition that the output signal of the optical sensor structure detecting direct light reaches a maximum value and that the output signal of the optical sensor structure detecting ambient light reaches a minimum value.

6. The optical sensor device according to claim 3, wherein the optical sensor device is configured to correct the output signal of the second optical sensor arrangement according to the haze index.

7. The optical device according to claim 4, wherein each of the at least one optical sensor structure and the at least one further optical sensor structure of the first optical sensor arrangement comprises color filters above the additional aperture, and
  wherein, for each of the at least one optical sensor structure and the at least one further optical sensor structure of the first optical sensor arrangement, the additional aperture is above the additional light-sensitive surface; and
  wherein the optical device is configured to determine the color correlated temperature of the incident light.

8. The optical sensor device according to claim 7, wherein the evaluation circuit is operable to provide the output signal of the second optical sensor arrangement under the condition that the determined color correlated temperature is within a set range.

9. The optical sensor device according to claim 1, wherein the evaluation circuit is operable to display the incidence angle of the incoming light measured by the first optical sensor arrangement.

10. The optical sensor device according to claim 1, wherein a range of valid values of an output signal of the first optical sensor arrangement can be set.

11. The optical sensor device according to claim 1, wherein the optical sensor structures in the first and/or the second optical sensor arrangement are shaped hexagonally and are arranged in a honeycomb structure.

12. The optical sensor device according to claim 1, wherein in the first optical sensor arrangement, the at least one optical sensor structure is covered with an infrared blocking filter.

13. The optical sensor device according to claim 1, wherein in the second optical sensor arrangement, the at least one optical sensor structure is covered with an ultraviolet pass filter.

* * * * *